United States Patent [19]

Dybel

[11] 4,138,898

[45] Feb. 13, 1979

[54] SYSTEM FOR CONTINUOUSLY MONITORING COMPRESSION AND TENSION LOADS ON FORCE CARRYING MEMBER

[76] Inventor: Frank R. Dybel, 981 Wingate Rd., Olympia Fields, Ill. 60461

[21] Appl. No.: 865,794

[22] Filed: Dec. 30, 1977

[51] Int. Cl.² .............................................. G01B 7/16
[52] U.S. Cl. ...................................... 73/767; 73/772
[58] Field of Search ............ 73/88.5 R, 141 R, 141 A, 73/93; 78/88.5 R

[56] References Cited

U.S. PATENT DOCUMENTS

| | | | |
|---|---|---|---|
| 3,402,609 | 9/1968 | Chiku et al. | 73/88.5 R X |
| 4,055,078 | 10/1977 | D'Antonio et al. | 73/88.5 R |

Primary Examiner—Jerry W. Myracle

Attorney, Agent, or Firm—Leydig, Voit, Osann, Mayer & Holt, Ltd.

[57] ABSTRACT

A system for continuously monitoring both compressive and tension loads on a force carrying member. The system includes a transducer having a pair of physically aligned piezoelectric elements which each are adapted to sense changes in stresses in the load carrying member to produce electrical output signals which can be separately utilized by tension and compression load monitoring circuits. The illustrated system discloses a compression load monitoring circuit that is responsive to electrical output signals generated by one of the piezoelectric elements upon an increase in compressive stresses in the member and a tension load indicating circuit which is responsive to electrical signals generated by the other piezoelectric element upon an increase in tension stresses in the transducer.

6 Claims, 3 Drawing Figures

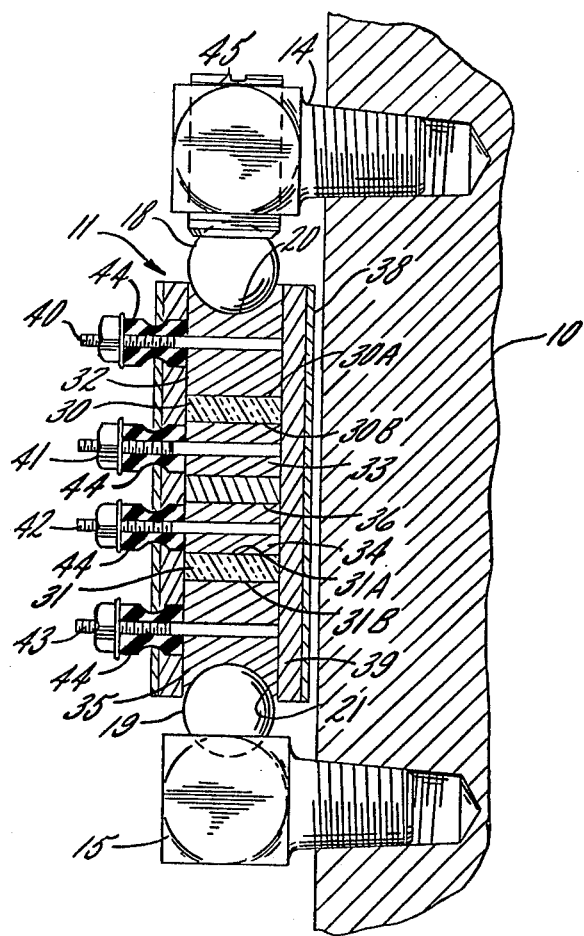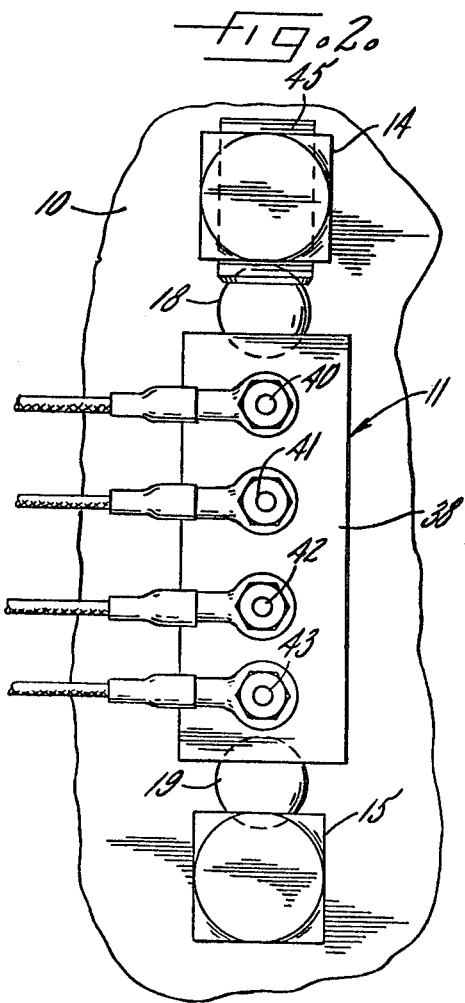

SYSTEM FOR CONTINUOUSLY MONITORING COMPRESSION AND TENSION LOADS ON FORCE CARRYING MEMBER

DESCRIPTION OF THE INVENTION

The present invention relates generally to systems for monitoring and controlling loads that are intermittently applied to force carrying members, such as the pitmans of production punch presses, and more particularly, to such systems which are adapted to monitor both compression and tension loadings on the member.

Applicant's prior U.S. Pat. No. 3,884,068 discloses a load monitoring system adapted to continuously monitor successive compressive stresses exerted on a press member, and to also selectively determine and limit the tension or reverse loads that may occur. In the system illustrated in that patent, the tension loadings can be determined and controlled whenever a reversal load switch is depressed. While such a system has been found to be highly useful in practice, it is not adapted for continuously monitoring both compression and tension loadings, which has been found to be desirable in some punch press applications. Heretofore, this has been possible only by using two separate load monitoring systems, each being operated from a respective transducer mounted at different locations on the press member. Such dual systems are not relatively expensive, but the mounting holes for the additional transducer increases the cost of installation of the system and can affect the structural integrity of the member. Furthermore, because separate transducers are necessary, such systems do not monitor loadings at the same point on the press.

Accordingly, it is an object of the present invention to provide an improved load monitoring system adapted to continuously monitor both compression and tension forces at a single point on a load carrying member.

Another object is to provide a load monitoring system as characterized above which is operated from a single transducer.

Other objects and advantages of the invention will become apparent upon reading the following detailed description and upon reference to the drawings in which:

FIG. 1 is a fragmentary section of a force carrying member of a press with a piezoelectric stress sensing transducer embodying the present invention mounted thereon;

FIG. 2 is a top plan view of the transducer, shown in FIG. 1; and

Figure 3:
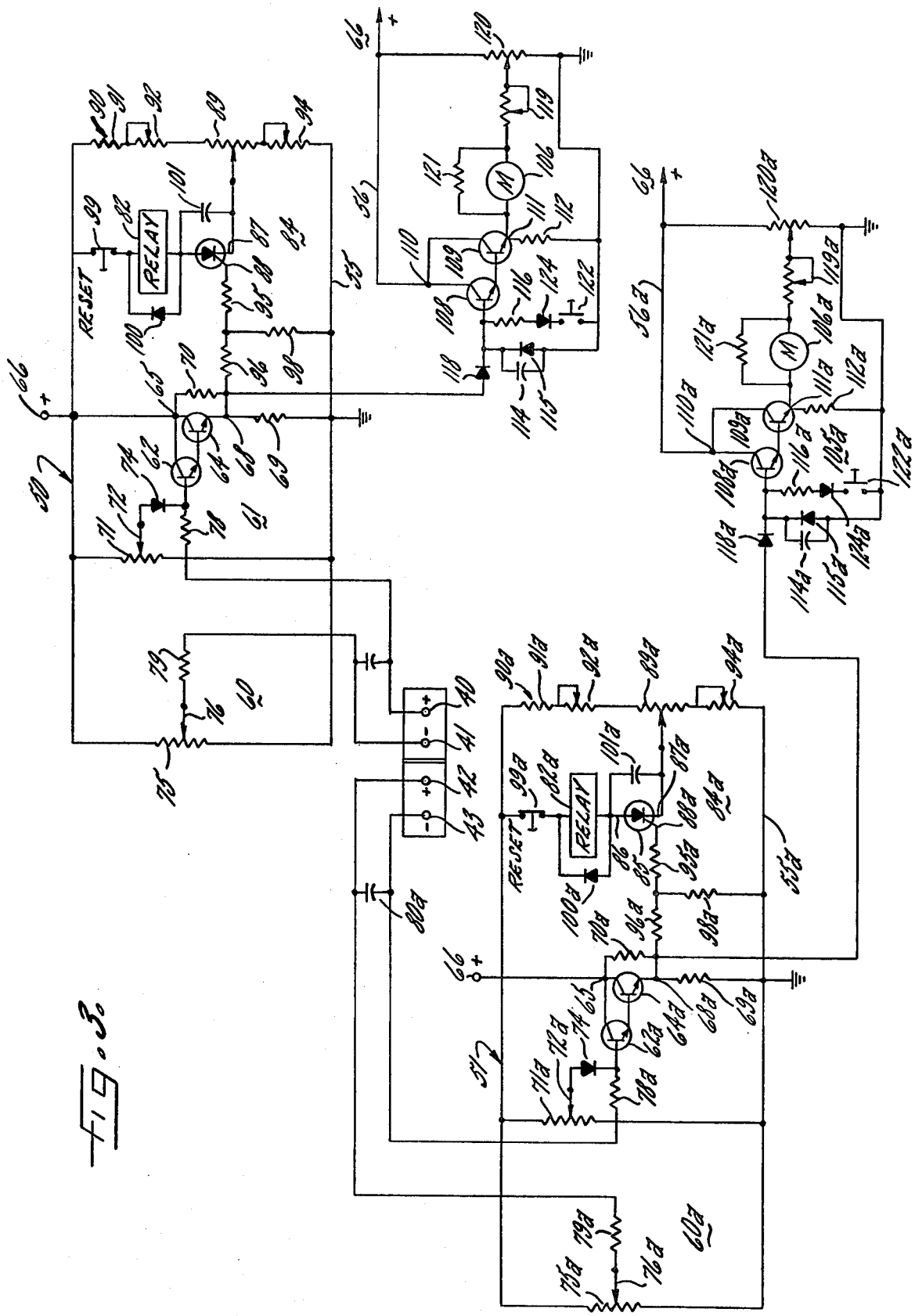
FIG. 3 is an electrical diagram of a sensing circuit for use with the illustrated monitoring system.

While the invention is susceptible to various modifications and alternative constructions, a certain illustrative embodiment has been shown in the drawings and will be described below in detail. It should be understood, however, that there is no intention to limit the invention to the specific form disclosed, but, on the contrary, the intention is to cover all modifications, alternative constructions, and equivalents falling within the spirit and scope of the invention.

Referring more particularly to the drawings, there is shown an illustrative system embodying the present invention for monitoring loads that are intermittently incurred by a force carrying member 10, such as the pitman of a punch press. The system includes a transducer 11 that is supported on the member 10 by a pair of brackets 14, 15 which in this case are screwed into the member. The transducer 11 is clamped between the outer ends of the two brackets in spaced relation to the pitman to provide what may be characterized as a parallel mechanical circuit for shunting small portions of the stresses that may be incurred in the member 10 and applying them to the transducer 11. The ends of the brackets 14, 15 between which the transducer 11 is clamped are provided with ball and socket joints including balls 18, 19 that engage sockets 20, 21 in opposed ends of the transducer. The brackets preferably are electrically insulated from the transducer by the balls 20, 21, which may be made of a refractory insulating material.

In accordance with the invention, the transducer includes a pair of physically aligned piezoelectric elements that are each adapted to incur stresses applied to the transducer to produce a plurality of electrical output signals which can be separately utilized to continuously monitor both compression and tension loadings on the force carrying member. In the illustrated embodiment, a pair of piezoelectric crystals 30, 31 each are disposed between respective pairs of blocks 32, 33 and 34, 35. The ball receiving sockets 20, 21 in this case are formed in the outer terminal block 32, 35 of each pair, while the inner terminal blocks 33, 34 are separated by an insulator 36, such as a ceramic plate. The piezoelectric crystal elements 30, 31 may be of any known material which produces a voltage upon the application of force, such as, for example, quartz crystals or ceramic crystals. When the crystals 30, 31 are subjected to an increase in pressure, they each are adapted to create a charge of positive polarity at one side surface 30A and 31A and a charge of negative polarity on an opposite opposed surface 30B and 31B. As is known in the art, upon a reduction in pressure, the charges on the opposed surfaces of the piezoelectric elements would reverse. As shown in FIG. 1, the terminal blocks 32–35 and piezoelectric crystals 30, 31 are surrounded by a metallic sheath 38 that serves as a magnetic and electric shield. The sheath 38 is slightly larger than the terminal blocks and crystals to provide space for a surrounding layer 39 of an encapsulating and insulating plastic material. Leading from the terminal blocks 32–35 through the insulating layer 39 and the metallic sheath 38, are terminals 40–43, respectively. The terminals each are electrically insulated from the sheath 38 at their passageway therethrough by terminal insulators 44.

It will be seen that the transducer 11 is mounted between its support brackets 14, 15 so that a line normal to the interfaces between the piezoelectric crystal faces 30, 31 and the terminal blocks 32–35 is parallel to and aligned with stresses to be sensed or measured in the member 10 when under loads during a working cycle. In order to permit desired prestressing of the transducer crystals 30, 31 a set screw 45 is provided in the end of the bracket 14. The crystals must be prestressed sufficiently so that they are in a stressed condition under all conditions of loading during a working cycle of the member 11. In such prestressed condition, the resulting increases and decreases in stress in the member will act upon the transducer through its support bracketry 14, 15 and cause the piezoelectric crystals 30, 31 to each produce relatively high output signals proportional to the stress changes.

In keeping with the invention, a compression load monitoring circuit 50 is provided which is responsive to electrical output signals generated by the piezoelectric element 30 for indicating and controlling compressive forces on the load carrying member, and a tension load indicating circuit 51 is provided which is responsive to electrical signals generated by the piezoelectric element 31 for indicating and controlling tension forces incurred by the member. The compression load monitoring circuit 50 is coupled to the terminals 40, 41 and includes an input circuit 60 for a current amplifier 61, a load limiting circuit 55, and a load indicating circuit 56. The tension load monitoring circuit 51 is coupled to the terminals 42, 43 and similarly includes an input circuit 60a for a current amplifier 61a, a load limiting circuit 55a, and a load indicating circuit 56a.

Referring first to the compression load monitoring circuit 50 shown in FIG. 3, it will be seen that the input circuit 60 connects the output terminals 40, 41 to the current amplifier 61, which in this case consists of a pair of direct coupled transistors 62, 64 of the NPN variety. The transistors form what is commonly called an emitter follower type Darlington pair, having their collectors connected together at a point 65 and with the emitter of the first transistor directly attached to the base of the second transistor. The collector connection 65 is tied directly to a positive DC supply terminal 66 while the emitter terminal 68 constitutes the output terminal for the amplifier 61 and is connected to ground through a load resistor 69. A stabilizing resistor 70 having a value at least ten times larger than the load resistor 69 connects the output terminal 68 to the positive supply bus 66.

To effect a high input impedance from the amplifier 61 during static conditions, the amplifier input is biased to render the transistors conductive in their linear range. To this end, the input circuit 60 includes a first voltage divider 71 connected between ground and positive supply terminal 66. The voltage divider 71 in the present instance is variable through the movement of its wiper arm 72. The divided output voltage present on the wiper arm 72 is applied to the base of the transistor 62 via a diode 74 which is poled to allow bias current flow into the transistor 62. A second voltage divider 75, also in the form of a potentiometer, has a wiper arm 76 for establishing a reference voltage substantially equal to the bias voltage at the base of the first transistor 62 of the amplifier 61. The transducer 30 in this case is part of a branch that includes the transducer 30 itself, a pair of bandpass control resistors 78, 79 in series with the transducer, and a variable conditioning capacitor 80 and directional diode 81 both in parallel with the transducer. With the voltages at the opposite ends of the transducer branch being equal in the static condition of the circuit, zero current will flow through the transducer while it is in its inactive condition.

When an increase in stress occurs in the piezoelectric transducer 30, such as when a compressive force is exerted in the pitman during the working stroke of the press, the piezoelectric crystal 30 produces a voltage across the transducer of a polarity indicated in FIG. 3. This voltage will be proportional to the stress applied, but it will be conditioned or limited by the loading effect of the condensor 80 so that its full-load output is approximately 10 volts. Since the condensor 80 is parallel with the transducer terminals 40, 41, it does not act as an external biasing element so as to reduce the effectiveness of the transducer. As a result, a positive polarity results at the amplifier lead 58, and as the voltage across the transducer terminals rises, the output voltage from the amplifier 61 also rises in a 1:1 ratio. However, the current available to drive the emitter load resistors of the amplifier 61 will be several orders of magnitude greater than the transducer current.

In order to limit the compressive stresses applied to the force carrying member to a predetermined selected value, the limiting circuit 55 includes an output indicating means including a relay 82 which is adapted to be energized when the current amplified transducer signal exceeds a predetermined threshold value. The relay 82 in this case is selectively controllable by a relay control circuit 84 that includes a control rectifier 85 having anode, cathode and gate terminals 86, 87 and 88, respectively, with the cathode terminal 87 referenced to a variable voltage at the wiper of a potentiometer 89. The potentiometer 89 forms one part of a voltage divider 90 connected between ground and the positive supply terminal 66, which divider also includes a fixed resistor 91, a "coarse" control rheostat 92 and a "fine" control rheostat 94. The gate terminal 88 of the controlled rectifier 85 is connected to the output terminal 68 of the amplifier 61 through an input resistance 95 and a voltage divider consisting of resistors 96 and 98. The controlled rectifier 85, typically a silicon device designated as an SCR, is rendered conductive when the voltage at the gate terminal 88 exceeds the reference voltage at the cathode terminal 87 by a fixed amount. Once the rectifier begins conducting, it will remain conducting so long as the current flowing through the anode-cathode junction remains sufficiently high. In the present instance the forward current of the rectifier 85 is limited by the resistance of the lower branch or leg of the potentiometer 89, together with the resistance of the rheostat 94. Preferably, the relay 82 is selected to be energized with the forward current through the silicon controlled rectifier 85 limited to substantially the minimum holding current value necessary to maintain the rectifier 85 in conduction, thereby minimizing power consumption. The threshold voltage at which the rectifier will trigger is established by the reference voltage divider 90 and the gate voltage divider consisting of resistance 96 and 98. The potentiometer 89 is intended to be manually adjustable by way of a hand dial (not shown) which is calibrated to allow the user to easily choose the stress to be detected. It will be appreciated that when the relay 82 is activated the resultant current flow may be utilized to activate suitable monitoring means, such as a control switch for the press which will automatically shut down the press when the set load is exceeded.

To deenergize the relay 82 after it has been activated a re-set switch 99 is connected in series with the relay 82. A diode 100 is connected in parallel with the energization coil of the relay 82 and poled to dissipate the stored charge on the coil of the relay 82 at turn-off and to limit the reverse voltage build-up across the coil. The speed at which the relay deenergizes is further increased by a condensor 101 connected between the anode and the cathode terminals of the rectifier 85.

For the purpose of indicating the compression load on the press pitman during a working stroke, even though it is not of sufficient magnitude to activate the overload detection relay 82, the compression load indicating circuit 52 is connected to the output of the amplifier 61 at the emitter terminal 68. The indicating circuit 52 includes a current amplifier 105 having its output connected to a suitable meter 106. The amplifier 105 again is a Darlington arrangement of direct coupled transistors 108, 109 having their collectors at a common point 110 and with the emitter of the first transistor attached to the base of the second transistor. The collector connection 110 is tied to the positive DC supply terminal 66 while the emitter terminal 111 constitutes the output terminal for the amplifier 105 and is connected to ground through the resistor 112. Current flowing from the amplifier 61 charges a capacitor 114 connected in a line extending from the input of the transistor 108 to ground for providing a sufficiently prolonged voltage to maintain a current flow through the amplifier 105 and meter 106 to obtain the necessary meter reading. A directional diode 115 in this case is connected in parallel with the capacitor 114. A resistor 116 is provided in a line also extending from the input line for the transistor 108 to prevent shorting of the base of transistor 108 to ground, a diode 118 is included in the input line to prevent reverse current flow from the capacitor 114.

It will be seen that the output signal from the amplifier 105 into the meter 106 again will be proportional to the compressive stress communicated to the transducer 30 from the press pitman. To properly establish or calibrate the maximum and minimum readings of the meter, the output terminal of the meter is connected to a variable resistor 119 which in turn is coupled to the wiper of a potentiometer 120 connected between ground and positive supply terminal 66. A dampening resistor 121 in this case is connected in parallel with the meter 106. Following a work stroke of the press and the resulting load reading in the meter 106, the meter may be quickly returned to zero by depressing a reset button 122 connected in series with the resistor 116 and a diode 124 which has the effect of unloading the capacitor to ground.

The tension load monitoring circuit 51, unlike the compression monitoring circuit 50, is adapted to utilize signals generated by the piezoelectric element 31 during an increase in tension forces to indicate and control the tension loads incurred by the member. Nevertheless, the tension load monitoring circuit 51 is substantially similar to the compressive load monitoring circuit 50 and similar elements have been given the same reference numerals with the distinguishing suffix a added. Thus, as indicated previously, the tension load monitoring circuit 51 similarly includes an input circuit 60a to an amplifier 61a, a load limiting circuit 55a, and a load indicating circuit 56a. In this instance, however, the transducer terminal 42, which is of positive polarity when the force carrying member is incurring increased tensile forces or decreasing compressive forces, is coupled to the base of the amplifier transistor 62a through the input circuit 60a so that signals generated during tension loading of the member may be utilized by the load limiting circuit 55a and indicator circuit 56a. The function of the tension load monitoring circuit will become apparent from the following summary of the operation of the entire system.

From the foregoing, it will be seen that during compressive loading of the force carrying member 10, such as might occur to a press pitman during the downward working stroke of the press, the polarity of the transducer terminals 40, 42 will become positive, as indicated in FIG. 3. In such case, the piezoelectric element 30 generates a voltage buildup in the capacitor 80 of the compressive load monitoring circuit 50 and there results a current flow from the capacitor to the amplifier 61. Since the signal generated by the piezoelectric element 30 is proportional to the compressive force applied to the member and since the overload relay 82 may be set to conduct only when the transducer signal exceeds a predetermined threshold voltage, the limit circuit 55 is operative to detect when a determined maximum load condition is exceeded. Moreover, the meter 106 of the indicator circuit 56 coupled to the output of the amplifier 61 will indicate the compressive load in the member even though it does not exceed the overload limit.

During such compressing loading of the member 10, the positive terminal 42 for the tension load monitoring circuit 51 would be essentially connected to ground through the relatively small biasing resistors 79a, 75a. As a result, there would be no buildup of voltage in the capacitor 80a, or the positive charge at the terminal 42 would draw to zero any voltage buildup that might have been remaining in the capacitor from the previous cycle. Thus, there would be no current flow through the amplifier 62a, nor any activation of the tension limit circuit 55a or the tension indicator circuit 56a.

In the event the force carrying member 10 incurred a tension load, such as might occur if the member were a structural column of a press or as occurs in press pitmans as the result of a snap back action following completion of a working stroke, such tension forces would be indicated and controlled by the tension load monitoring circuit 51. Following the working stroke of the press and upon tensioning of the member 10, the polarity of the terminals 40-43 would be reversed. In other words, the terminals 41 and 43 would become positive and the terminals 40 and 42 negative. In such case, a voltage buildup would result in the capacitor 80a, and current would flow from the capacitor 80a to the amplifier 61a. The signal generated by the piezoelectric element 31 and the voltage in the capacitor 80a similarly would be proportional to the tension force applied to the member. The overall load relay 82a could be similarly set to conduct when the transducer signal exceeded a predetermined threshold voltage, so as to render the limit circuit 55a operative to determine when a maximum tension load condition was exceeded. The meter 106a of the indicator circuit 56a would indicate the tension loading on the member. During such tension loadings on the member 10, the positive transducer terminal 41 for the compression load monitoring circuit 50 would be essentially connected to ground through the biasing resistors 79, 76 and would dissipate any voltage buildup remaining in the capacitor 80 from the previous stroke.

Thus, it will be seen that the load monitoring system of the present invention is adapted to continuously monitor both compressive and tension loadings at a single point on a load carrying member. The system, furthermore, requires only a single transducer, thereby minimizing the number of mounting holes that must be drilled into the force carrying member, reducing installation costs, and minimizing the cost of the equipment.

I claim as my invention:

1. A system for monitoring loads that are intermittently applied to a force carrying member comprising a transducer, a pair of brackets mounted on said force carrying member for supporting said transducer between the ends thereof, said transducer including a pair of piezoelectric elements each adapted to generate an electrical output signal proportional to the change in stress on said member, first circuit means electrically coupled to one of said piezoelectric elements and being responsive to electrical output signals generated by said one element upon increases in compressive stresses in said member for monitoring compressive forces applied to said member, and second circuit means electrically coupled to the other of said piezoelectric elements and being responsive to electrical signals generated by said other element upon increases in tension stresses on said member for monitoring tension loadings applied to said member.

2. The load monitoring system of claim 1 in which said piezoelectric elements are physically aligned between said brackets in a line parallel to the stress to be detected in said member.

3. The load monitoring system of claim 2 including an insulator means interposed between said piezoelectric elements.

4. A system for monitoring loads that are intermittently applied to a force carrying member comprising a transducer, a pair of brackets mounted on said force carrying member for supporting said transducer between the ends thereof, said transducer including two pairs of terminals, a piezoelectric element interposed between the terminals of each said pair, said piezoelectric elements each being adapted to generate an electrical output signal at its respective terminals proportional to changes in stress in said member; first circuit means coupled to the terminals of one of said piezoelectric elements for monitoring compressive loadings on said member, and second circuit means coupled to the terminals of the other of said piezoelectric elements for monitoring tension loadings on said member.

5. The load monitoring system of claim 4 in which said first circuit means includes means responsive to electrical output signals generated by an increase in compressive stresses on said one piezoelectric element for indicating the compressive loading on said member, and said second circuit means includes means responsive to electrical signals generated by a reduction in stresses on said other element for monitoring the tension stresses on said member.

6. A load monitoring system of claim 5 including insulating means interposed between one said pair of terminal blocks and the other said pair of terminal blocks.